Figure 1:
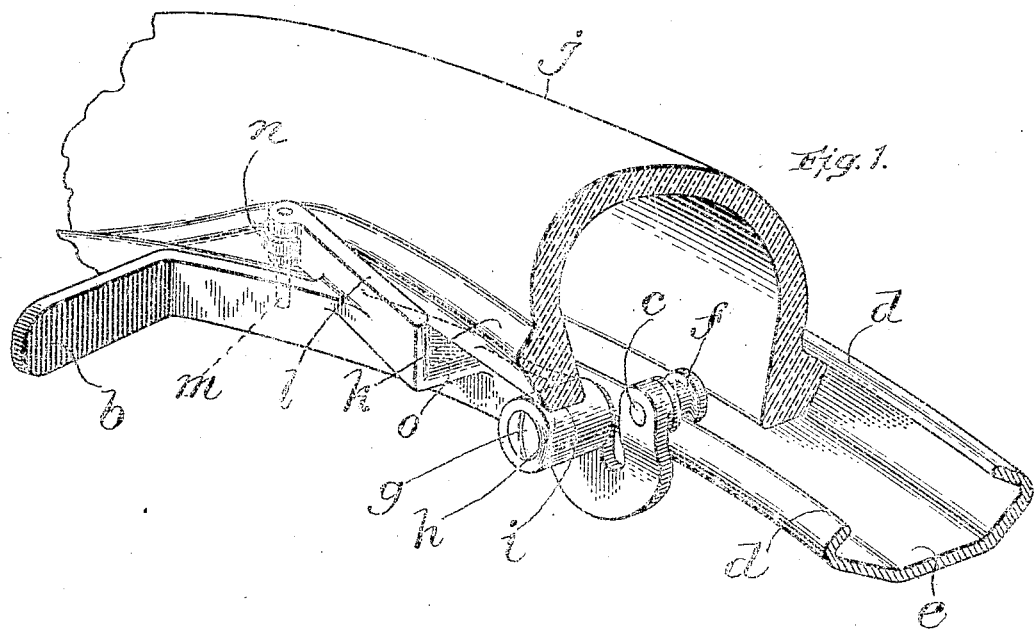

No. 786,611. PATENTED APR. 4, 1905.
R. THRELFALL.
TIRE SHOE SETTER.
APPLICATION FILED DEC. 3, 1904.

Witnesses:
O. W. Lezzette.
L. E. Kennedy.

Inventor:
Robert Threlfall
By Wright, Brown & Quinby
Attorneys.

No. 786,611. Patented April 4, 1905.

UNITED STATES PATENT OFFICE.

ROBERT THRELFALL, OF NEWTON, MASSACHUSETTS.

TIRE-SHOE SETTER.

SPECIFICATION forming part of Letters Patent No. 786,611, dated April 4, 1905.

Application filed December 8, 1904. Serial No. 236,013.

*To all whom it may concern:*

Be it known that I, ROBERT THRELFALL, of Newton, in the county of Middlesex and State of Massachusetts, have invented certain new and useful Improvements in Tire-Shoe Setters, of which the following is a specification.

This invention relates to devices for setting in place on the rim of a wheel the outer shoe of a rubber tire, and is designed particularly to place outer shoes which surround the inner tubes of pneumatic tires and are provided with beads on their side portions or edges which engage under the inwardly-directed flanges on the opposite sides of a wheel-rim, although it may be used to set in place complete tubes having beads or projections of the kind indicated.

The object of the invention is to provide a tool by which a tire or outer shoe may be set in place practically by a single continuous motion carried about the circumference of the wheel, thus greatly shortening the time required to set the tire. At the present time pneumatic and cushion tires are placed by means of levers of which an end is placed between the edge of the tire and the wheel-rim to pry the tire into engagement with the flange of the rim; but such placers act only at one point at a time and have to be moved and reinserted at other points successively in order to completely place the tire or shoe. With these tools and this method of operation a great deal of time is required to set a tire or tire-shoe even by those most expert, while with a novice the task is almost an endless one. A further objection besides the great amount of time required to the use of these hitherto-known tools arises from the fact that in setting the outer shoe of a tire having an inner tube it frequently happens that the end of one of these levers will pinch the inner tube against the wheel-rim and tear it while the shoe is being placed, thus necessitating removing the shoe again and after repairing the inner tube or inserting a new one performing the whole operation over again.

By my invention I have provided a tool which in use is placed in engagement both with the rim of the wheel and the bead of a tire-shoe and is provided with portions which raise the side or bead of the tire and force it over the edge of the rim and down into engagement beneath the inturned flange and which after being once placed in position is adapted to be moved progressively about the periphery of the wheel, remaining continuously in engagement with the wheel and the tire and forcing the latter into position as it is moved along, thus permitting the operation of placing the tire to be consummated by a single movement and greatly saving the time required for this operation. It is also incapable of extending inward far enough to pinch the inner tube, so that danger of tearing or puncturing the latter is wholly obviated.

Figure 2:
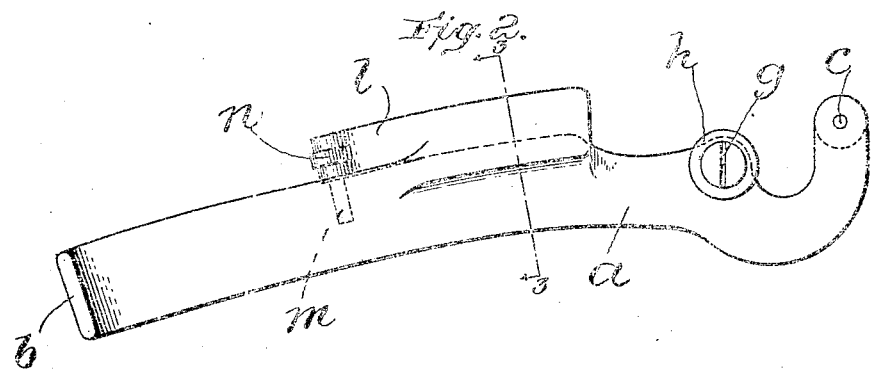
Figure 3:
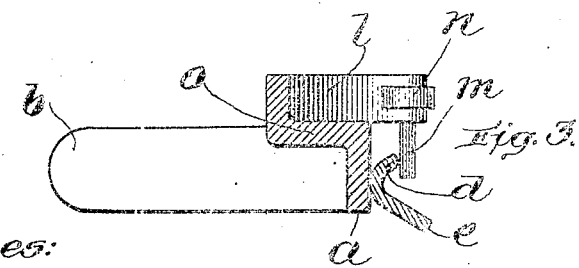

Of the accompanying drawings, Figure 1 represents a perspective view of a portion of a wheel-rim and an outer shoe, with the tool in position for placing the shoe. Fig. 2 represents a side elevation of the tool. Fig. 3 represents a section on line 3 3 of Fig. 2 looking in the direction of the arrows and showing the tool engaged with a wheel-rim.

The same reference characters indicate the same parts in all the figures.

The tool comprises a body portion $a$, provided at one end with a handle $b$, which may be made by turning up at right angles an integral portion of the body, or it may be separate and detachably secured to the body. At one end the tool is provided with a stud $c$, projecting substantially at right angles and adapted to be extended over a flange $d$ of a wheel-rim $e$. Preferably the stud will be provided with a roller $f$, having a groove for engagement with the flange to reduce the friction. Near the stud $c$, but projecting from the opposite side of the body of the tool, is a stud $g$, which may have journaled upon it an antifriction-roller $h$, arranged to engage the under surface $i$ of the side or edge of a tire or tire-shoe $j$, having a bead $k$. The upper surface of the roll $h$, which may be termed a "conductor," is located so that when the tool is in use adjacent the rim of a wheel it will be practically at the same level as the flange $d$ and will act to raise the side of the tire-shoe to that level. In the rear of the conductor when the tool is in position for use is an arm or web *l*, preferably formed integral with the body portion and extending at an inclination thereto, its ends projecting on the opposite sides of the latter. Upon the end of the arm or web which extends inward toward the wheel is mounted a pin or stud *m*, which is also adapted to engage and bear against the flange *d* of the wheel-rim. The end of the arm may also have an antifriction-roller *n*. The forwardly or outwardly extending portion of the arm is connected by a web *o* with the body portion.

As shown, the body portion is formed with a curve substantially corresponding to the curvature of the wheel-rim, the stud *e* and roller *h* being practically in a line concentric with the rim when the tool is in position for use, and the stud *g* is approximately in said line, though slightly below it, the bearing-surface of the latter and the web *o* being practically in the same plane as the flange *d*, while the arm or flange *l* rises above said plane substantially perpendicular thereto.

The manner of operation of the tool will be readily understood from an inspection of Fig. 1. One side of the tire is set in place in the wheel-rim with its bead engaging the flange *d'* of the rim, the other side projecting over the flange *d*. The tool is then set in position, with the studs *e* and *m* projecting under the tire and over the flange *d* and engaging the latter. The conductor-roll *h*, web *o*, and arm or flange *l* then engage the inner surface and the bead of the projecting portion of the tire, the former part raising the tire to the level of the flange, while the rear end of the arm *l* forces it over into the space between the flanges *d* and *d'*. The tool being grasped by the handle will be moved in a direction toward the right, as seen in Fig. 1, and as it progresses around the wheel it will progressively pick up and crowd inward the projecting edge of the tire. Thus the tire can be set by what is practically a single continuous movement in a much shorter time and fully as accurate a manner as is possible by the methods now in use. It will thus be seen that by the use of my invention a great saving of time in the placing of a tire may be effected, also that the inner tube is protected from injury and the ease of operation is greatly increased.

Changes may be made without departing from the spirit of this invention. The antifriction-rollers *g*, *h*, and *n* may be omitted, if desired, their only function being to lessen the amount of effort required in using the tool. The stud *m* may also be omitted, the tool then being required to be pressed with greater force toward the wheel than when the stud is employed. Also the handle may be differently placed and the relative arrangement of the parts reversed, if desired, so that the tire may be set by a movement in the opposite direction.

I claim—

1. A tire-setter having a portion adapted to engage with a wheel-rim, a portion arranged to engage and raise the inner edge of a tire, a portion for engaging the side of the tire and pressing the same between the flanges of the wheel-rim, and a hand-engaging portion, all the parts being arranged to extend approximately parallel to the periphery of the wheel when the device is in operation, and having their only connection with the wheel at the rim thereof.

2. A tire-setter comprising a projection arranged to engage the inturned edge of a wheel-rim, and portions for engaging the bead of a tire to force the same over and into engagement with the edge of the rim, all the parts of said setter being located approximately in a line which is adapted to extend parallel to the edge of the rim when the device is in operation.

3. A tire-setter having a projection adapted to engage the flange of a wheel-rim and run along the same, and portions located in rear of said projection when the device is in use for engaging the bead of a tire and forcing the same over and into engagement with the flange of the rim, all the parts of said setter being arranged to occupy a position substantially parallel to the rim of the wheel when in use.

4. A tire-setter having a rim-engaging portion adapted to remain in continuous engagement with the rim of a wheel, and a tire-edge-turning portion adapted to continuously engage the inner edge of a tire and to be advanced along the wheel-rim while setting a tire, all the parts of said setter being arranged to occupy a position substantially parallel to the rim of the wheel when in use.

5. A tire-setter comprising a body portion having a shape conforming to a portion of the periphery of a wheel-rim, a projection extending from one side thereof and adapted to extend over and engage the inwardly-directed flange of a wheel-rim, an inclined arm adapted to project obliquely over the edge of the rim and to engage the side of a tire to force the same over and into engagement with the rim, and a projection intermediate the first-named projection and arm extending from the opposite side of the body portion having a bearing-surface in a plane substantially at right angles to that of the bearing-surface of the arm and adapted to engage the inner edge of a tire.

6. A tire-setter comprising a body portion having a shape conforming to a portion of the periphery of a wheel-rim, a projection extending from one side thereof and adapted to extend over and engage the inwardly-directed flange of a wheel-rim, an inclined arm adapted to project obliquely over the edge of the rim and to engage the side of a tire to force the same over and into engagement with the rim, a projection intermediate the first-named projection and arm extending from the opposite side of the body portion having a bearing-surface in a plane substantially at right angles to that of the bearing-surface of the arm and adapted to engage the inner edge of a tire, and rollers mounted on said projections and arm.

7. A tire-setter, comprising a body portion, an arm carried by said body portion and extending at an angle thereto, a projection carried by the arm adjacent its end for engaging the rim of a wheel, a projection carried by the body portion also arranged to engage the wheel-rim, and a bearing-surface adapted to engage the surface of a tire adjacent the rim, said parts all being arranged to occupy a position substantially parallel to the rim of the wheel when in use.

8. A tire-placer comprising a body portion, an arm carried by the body portion extending at an angle thereto with its ends projecting on opposite sides of the body portion, one of the ends being adapted to project over the rim of a wheel when the device is being used, a web joining the other end of the arm with the body portion, a projection having a bearing-surface substantially in line with the said web, and a second projection on the other side of the body portion arranged to extend over and engage a portion of the wheel-rim.

9. A tire-placer having portions arranged for simultaneous engagement with a wheel-rim and a portion of a tire, and adapted to remain in continuous engagement therewith and to be moved progressively about the wheel-rim, the tire-engaging portion being constructed to force the tire over and into engagement with the rim, all the parts of the placer being adapted to occupy a position beside the rim, and the only engagement of the placer with the wheel being at the rim when in use.

In testimony whereof I have affixed my signature in presence of two witnesses.

ROBERT THRELFALL.

Witnesses:
A. C. RATIGAN,
ARTHUR H. BROWN.